Jan. 3, 1928.
J. E. PFLUEGER
1,654,830
ATTACHMENT FOR SECURING LURES TO FISHHOOKS AND THE LIKE
Filed Jan. 6, 1925
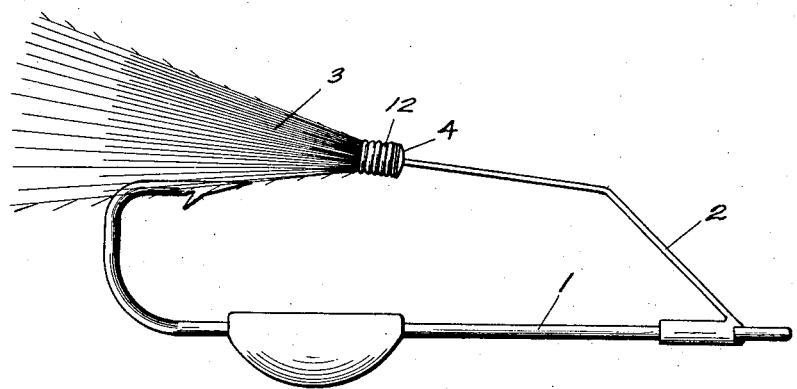
FIG-1
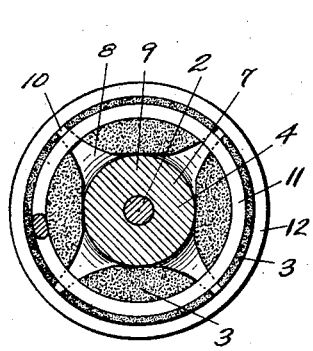
FIG-3
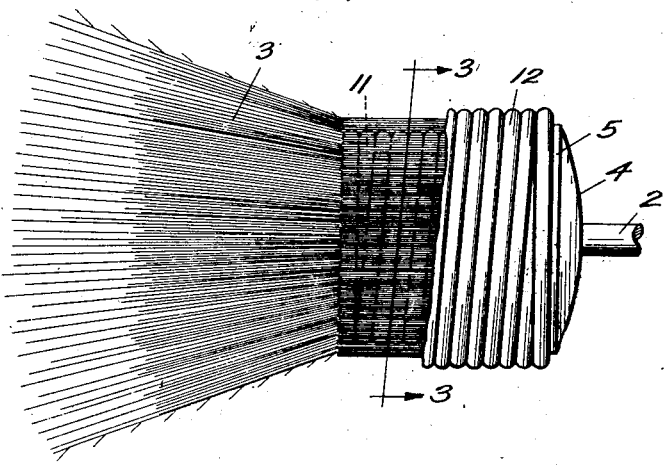
FIG-2
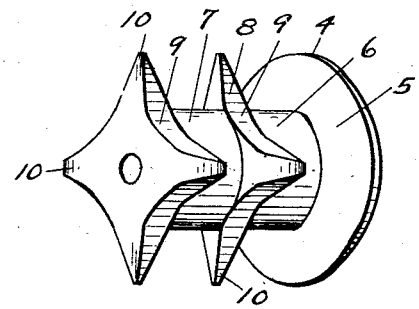
FIG-4
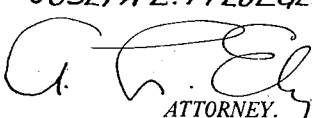
INVENTOR.
JOSEPH E. PFLUEGER
BY
ATTORNEY.

Patented Jan. 3, 1928.

1,654,830

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

ATTACHMENT FOR SECURING LURES TO FISHHOOKS AND THE LIKE.

Application filed January 6, 1925. Serial No. 794.

This invention relates to fishing tackle and particularly to fish hooks or the like which are provided with lures in the form of bunch or bunches of hair, bucktails, feathers or other lures, the object of the invention being to provide for a means of attaching these devices to the hooks, weed guards or the like in a secure and lasting manner. It is also one of the objects of the invention to provide a device of this character which will assist in the construction of blended lures, comprised of a group of hair, feathers, or the like of varying colors.

In the drawing is shown one form of the invention, it being understood that changes and modifications may be made within the scope of the invention and the appended claim.

In the drawings:

Figure 1 is a side elevation of a hook provided with a light flexible weed guard to which the lure is attached.

Figure 2 is an enlarged view of the base of the lure, part being broken away to show the manner of attachment.

Figure 3 is a section on the line 3—3 of Figure 2.

Figure 4 is a perspective view of the holder or spreader.

In the present showing of the invention, the means for attaching the lure is shown upon a light, flexible weed guard associated with the hook, but it will be understood that the means of attachment may be used in other locations than that specifically illustrated. The numeral 1 indicates the hook and 2 the weed guard. The lure, as a whole, is indicated by the numeral 3 and in the drawing is shown as comprised of a bunch of hair, which may be in a single or multiplicity of colors.

The object of the invention being to provide a more secure and efficient means for securing the hair upon the member which carries it, use is made of a holder which is secured upon the end of the wire 2. This holder is indicated by the numeral 4 and is provided with a central bore through which wire 2 is received. The holder is provided with a rear flange 5 and one or more circumferential channels 6 and 7, two being shown in this embodiment of the invention. Between the two channels and on the outer end of the holder are separating rings or flanges 8 which are cut away to provide registering longitudinal channels 9, separated by points 10, the rings or flanges thus presenting the appearance of stars, provided in the present instance with four points.

In assembling the lures, a group of hairs or feathers is placed in each longitudinal channel, the ends of the hairs or feathers lying within the channel 7. Where a blend, or rainbow effect is desired, each group of hairs is of different colors, the star points enabling the colors to be distributed uniformly about the lure and keeping the different colors separated from one another. When the hairs have been laid in the manner described, the operator wraps the ends down into the channel by a spiral winding of waxed thread 11, the ends of which are tied and the thread is then varnished. Second groups of hair or feathers are then laid over the first group in the channel 6 and secured by a second winding of thread 12, in the same manner as the first winding, except that the second winding is carried over the entire holder, as shown in Figure 1.

It will be observed that a very firm anchorage is provided for the lure, the stars preventing the hair from pulling out and further providing a spacing device for the vari-colored groups in making a blended lure. The sharp points 10 do not show through the hair or the winding.

What is claimed is:

A device for attaching lures to fish hooks or the like, comprising a holder, circumferential channels about the holder, a star shaped flange adjacent the channels, the lures being located between the points of said star, the ends thereof lying within the channels and a wrapping about the ends of the lures.

JOSEPH E. PFLUEGER.